United States Patent
Westphal et al.

(10) Patent No.: US 12,332,166 B2
(45) Date of Patent: Jun. 17, 2025

(54) METHOD FOR PRE-CALIBRATING AND CORRECTING MEASUREMENT ERRORS OF A SPECTROSCOPIC MEASUREMENT DEVICE, AND MEASUREMENT DEVICE

(71) Applicant: Carl Zeiss Spectroscopy GmbH, Jena (DE)

(72) Inventors: Peter Westphal, Jena (DE); Daniel Bublitz, Rausdorf (DE); Karsten Lindig, Erfurt (DE)

(73) Assignee: Carl Zeiss Spectroscopy GmbH, Jena (DE)

( * ) Notice: Subject to any disclaimer, the term of this patent is extended or adjusted under 35 U.S.C. 154(b) by 148 days.

(21) Appl. No.: 18/207,189

(22) Filed: Jun. 8, 2023

(65) Prior Publication Data
US 2023/0408402 A1   Dec. 21, 2023

(30) Foreign Application Priority Data
Jun. 21, 2022   (DE) ..................... 10 2022 115 363.0

(51) Int. Cl.
*G01N 21/31*   (2006.01)
(52) U.S. Cl.
CPC ....... *G01N 21/31* (2013.01); *G01N 2201/127* (2013.01)
(58) Field of Classification Search
CPC .................. G01N 2201/127; G01N 21/31
See application file for complete search history.

(56) References Cited

U.S. PATENT DOCUMENTS

2006/0152726 A1 *  7/2006  Larsen .................. G01J 3/42
356/416

FOREIGN PATENT DOCUMENTS

| CN | 113008815 A | * | 6/2021 |
| EP | 1740928 B1 | | 4/2016 |
| WO | 2019072729 A1 | | 4/2019 |

OTHER PUBLICATIONS

Edgar Siegfried Zaus, Dissertation, dated Dec. 12, 2007.

* cited by examiner

*Primary Examiner* — Maurice C Smith
(74) *Attorney, Agent, or Firm* — Stuart H. Mayer; Kaplan Breyer Schwarz LLP

(57) ABSTRACT

A measurement device for spectroscopic constituent analysis includes a control unit, a light source, a sample holder arranged in the beam path of the light source, and a spectral measurement module. The measurement module comprises at least one photosensor with organic photodiodes arranged on a substrate and a temperature sensor arranged at the photosensor. During a sample measurement, a method using the measurement device comprises: detecting an actual temperature at the photosensor; pivoting-in a dark reference sample and measuring a dark reference value; pivoting-in a bright reference sample and measuring a bright reference value; measuring a spectral value of the sample and correcting the spectral value by means of a correction calculation by way of the control unit using the dark reference value, the bright reference value, the spectral value of the sample, the temperature and using values which were determined in a pre-calibration and stored in the control unit.

12 Claims, 3 Drawing Sheets

METHOD FOR PRE-CALIBRATING AND CORRECTING MEASUREMENT ERRORS OF A SPECTROSCOPIC MEASUREMENT DEVICE, AND MEASUREMENT DEVICE

BACKGROUND OF THE INVENTION

The present invention relates to a method for pre-calibrating a spectroscopic measurement device and to a method for correcting measurement errors which arise in such a measurement device, especially as a result of temperature drift and/or component wear (radiation source drift, component part aging). The invention also relates to a measurement device for spectroscopic constituent analysis, which is able to apply the method according to the invention for the correction of measurement errors arising.

The relevant measurement device in this case is suitable in particular for the spectroscopic constituent analysis for the purpose of determining constituents in a sample, in particular a bulk material. The constituent analysis is preferably usable in agriculture and in the food industry.

Generic measurement devices require a sensor which detects the radiation diffracted at the measurement object.

EP 3 152 785 B1 discloses a method for detecting infrared electromagnetic radiation and an optoelectronic component for recording an electromagnetic signal in the wavelength range from 780 nm to 10 µm. The optoelectronic component is arranged on a substrate and comprises two spaced apart, opposing mirror surfaces and a photoactive layer arranged therebetween. EP 3 152 785 B1 describes further that detectors are frequently operated using an externally applied voltage in order to obtain a greater external quantum efficiency in the detection range.

In principle, organic photodiodes typically having a photosensitive, organic layer placed in an optical resonator such that a wavelength-selective, organic photodiode arises are known. If use is made of a plurality of different organic photodiodes with adapted optical resonators for different wavelengths, it is possible to construct a spectroscopic sensor which is usable in appropriate measurement devices.

WO 2016/055047 A1 describes a device for spectrometric detection of light using a photodiode which is monolithically integrated into the layer structure of a wavelength-selective filter. The photodiode includes the following detector layers: a photoactive layer, a first electrode, and a second electrode.

DE 10 2014 014 983 A1 has disclosed an optical filter element for spectroscopic or spectrometric equipment for converting spectral information into spatial information. The filter element is assigned a detector. A micro-resonator is arranged on a surface of a substrate of the filter element. The filter element also has layer structures and resonator layers.

DE 10 2019 102 176 A1 discloses a hybrid, multispectral component which comprises a substrate and at least one first and one second function element for detection.

DE 10 2019 113 346 A1 describes an optoelectronic component which comprises a substrate, a first and a second electrode, and a first and a second reflective surface.

Thermal drift or temperature drift is understood to mean an unwanted change in the behavior of a component or device over time as a result of the effect of the temperature. This behavior also occurs in spectroscopic measurement devices, in particular in the light sources thereof and/or the sensor used. At the same time, spectroscopic measurement devices require a very high measurement accuracy, with the result that falsifications of the measurement data as a result of temperature drift and/or component wear processes are undesired and need to be avoided or minimized in the long term in order to have precise measurement results. Hence, components including the photosensors which have a very low temperature drift are usually selected for such use.

The drift problem, for example in relation to lasers, is also known from EP 3 633 352 A1. Described there is that the influence of the external temperature or the aging of the laser or the electronics contributes to the drift. A temperature correction of the recorded operational parameter can be carried out, for example, on a computer unit by means of a program stored thereon, but this increases the technical outlay and may reduce the speed with which the measurement is carried out.

In the thesis entitled "Entwicklung und Charakterisierung von organischen Photodetektoren", E. S. Zaus (2007; University of Erlangen-Nuremberg) describes inorganic and organic semiconductors. From this thesis, it is possible to gather that organic photodiodes are usable for example in a temperature range from 5° C. to 80° C., but in the process have different temperature-dependent current-voltage characteristics in the dark and under illumination. Thus, the signal current may deviate by approximately 10% on account of the temperature change. This phenomenon, which occurs in a sensor, is also referred to as a temperature drift.

DE 10 2004 025 448 A1 has disclosed a method for measuring a spectrum of a measurement sample by means of an infrared spectrometer and such an infrared spectrometer. The spectrometer has a component part whose operational behavior is influenced at least by one operational parameter. This operational parameter is recorded at least once during the measurement, the operational behavior of the component part is calculated back to a predetermined reference value of the operational parameter on the basis of the recorded operational parameter, and the detected spectrum is corrected accordingly. To the extent that the operational parameter is the temperature, this should dispense with the requirement of operating the spectrometer in a specifically conditioned, in particular climate-controlled environment, with the result that the spectrometer can be operated in usual laboratory surroundings.

WO 2019/072729 A1 describes a mobile constituent analysis system and a method of sample-appropriate measurement using this system. The method described envisages, inter alia, the following method steps: selecting a calibration product fitting to a sample to be examined, and carrying out a plausibility check for the selected calibration product. If an incorrect selection of the calibration product is determined, then the selection of an alternative calibration product is initiated. Measurement conditions to be observed, specifically a measurement point and a measurement duration, depending on the selected calibration product are output in a further method step. Furthermore, measurement values are recorded at the sample, with the measurement conditions being monitored.

WO 2019/072729 A1 cites EP 1 740 928 B1, which relates to a method for recalibrating a spectroscopic measuring head. Internal and external references, which are pivoted into the beam path of the measuring head, are used within the recalibration method.

In the field of constituent analysis specifically, the measurement accuracy should regularly be of the order of approximately 0.1%. On account of their large temperature drift, this therefore appears to preclude the use of organic photodiodes if the constituent analysis is intended to be implemented by means of a spectrometer. Temperature control of the spectroscopic measurement module would be conceivable for the purposes of attaining the required measurement accuracy and counteracting a large temperature drift. However, this solution would be very complicated and hardly realizable for industrial use, as the closed-loop control must remain within a tolerance of exactly 0.01° C. For inorganic InGaAs detectors, the tolerable temperature change in corresponding arrangements on account of the comparatively small temperature drifts is approximately 2 K. By contrast, in comparable analysis arrangements using organic photodiodes, the tolerable temperature change would only still be approximately 25 mK on account of significantly larger temperature drifts. Consequently, the temperature change tolerable especially in constituent analysis arrangements is approximately 80-times smaller for polymer-based spectral sensors or organic photodiodes than for InGaAs sensors. Logically, experts have to date consequently dispensed with the use of organic photodiodes in such applications.

Proceeding from the prior art, an object of the present invention consists in making available an improved method for compensating or correcting for the temperature drift and/or arising component wear in spectroscopic measurement devices. In particular, the invention should thereby enable the use of organic photodiodes in spectroscopic measurement devices, especially for the constituent analysis, which were considered excluded to date on account of large temperature drifts. It is also an object of the present invention to provide a spectroscopic measurement device having an organic photodiode and improved correction of the measurement values, which measurement device can in particular carry out the method specified above.

SUMMARY OF THE INVENTION

This object is achieved by a method according to the invention for pre-calibrating a spectroscopic measurement device as claimed in claim 1 or by a method for correcting measurement errors as claimed in appended claim 2, and by a spectral measurement device as claimed in alternative independent claim 5.

The method according to the invention serves to correct measurement errors which arise due to temperature drifts and/or component wear at a spectroscopic measurement device, in particular at the photosensor used therein. The spectroscopic measurement device preferably serves for the contactless constituent analysis of a sample and comprises a control unit, a light source, and a sample holder for holding the sample to be measured or analyzed. The sample holder is arranged in the beam path of the light source. The measurement device also comprises a spectral measurement module with at least one photosensor. The photosensor is formed by a substrate on which at least one organic photodiode is arranged or formed. A single organic photodiode, or alternatively two or more organic photodiodes, may be arranged on the substrate. The measurement module also comprises a temperature sensor which is arranged at the photosensor, with very good thermal coupling to the photosensor needing to be ensured. The temperature sensor serves to detect an absolute temperature at the photosensor and a temperature gradient over time.

Organic photodiodes belong to the field of what is known as polymer electronics. A photosensor used for the spectroscopic measurements in question in this case may comprise 2 to 2000 (or more) organic photodiodes. The photosensor preferably comprises 3 to 200 organic photodiodes. The photosensor particularly preferably comprises 4 to 100 organic photodiodes. Each photodiode is assigned a spectral channel. The photodiodes are preferably arranged on a substrate, whereby they have a joint anode or a joint cathode. Alternatively, the photodiodes can each be arranged separately on an individual substrate, with the photodiodes then being electronically contacted on an individual basis.

The organic photodiode comprises an organic layer, the organic layer having a layer thickness in the nm range to μm range. In addition to the organic layer, the photodiode comprises two reflective or partly reflective interfaces, between which the organic layer is arranged. The interfaces form an interference filter, the effect of which is limited by the distance between the two interfaces and the optoelectronic properties of the organic layer. The wavelength to which the photodiode is sensitive is defined by the spacing of the two interfaces of the respective photodiode.

The method according to the invention uses calibration values and reference values, which are obtained in a method stage of pre-calibration. According to a preferred embodiment, the method according to the invention may comprise a method stage of pre-calibration prior to the method stage of sample measurement. The pre-calibration is regularly carried out by the device manufacturer and only needs to be carried out anew by the user on an intermittent basis if this section is required again. Thus, only the method stage of sample measurement should be carried out during normal operation.

During the pre-calibration, the method provides for calibration values to be determined at a measurement location and for reference values to be determined in a reference measurement plane offset from the measurement location (in relation to the beam path of the measurement light), using a calibration sample and a reference sample, respectively. The calibration sample may also be referred to as an external sample (as it is preferably introduced into the measurement device only for calibration purposes) and the reference sample as an internal sample (as it is preferably stored in the measurement device as a reference). The calibration values and the reference values are saved or stored in the control unit. The measurement location is situated on the sample holder, with the sample holder, as described above, being located in the beam path of the light source.

The sample to be measured is also placed at the measurement location in a method step of the subsequent method stage of sample measurement. The reference measurement plane is arranged offset to the measurement location and likewise located in the beam path. For example, the distance between the reference measurement plane and the measurement location may be between 0.5 cm and 5 cm. Preferably, the distance between the reference measurement plane and the measurement location is between 1 cm and 3 cm. The offset or the distance between the reference measurement plane and the measurement location is advantageous since a sample at the measurement location need not be removed when a reference measurement is carried out since the reference measurement occurs in the reference measurement plane. The offset between the reference measurement plane and the measurement location is taken into account by the method steps of the pre-calibration. The distance between the reference measurement plane and the light source is preferably smaller than the distance between the measurement location and the light source. Alternatively, the distance between the reference measurement plane and the light source can be greater than the distance between the measurement location and the light source. However, it is also conceivable for the measurement location and the reference measurement plane to be located in the same plane, with this possibly meaning increased outlay for the user.

For the method, the following method steps are provided during the sample measurement.

In a first method step, an actual temperature of the spectral measurement module, in particular of the photosensor, is determined by means of the temperature sensor. The actual temperature is transmitted to the control unit. Preferably, the actual temperature of the photosensor can be detected before, during and/or after each spectroscopic measurement. In this case, the actual temperature can be measured once or multiple times for the purpose of determining the measurement value.

In a further method step, a dark reference sample is pivoted into the beam path of the light source, with the result that the dark reference sample is located in the reference measurement plane. Subsequently, a dark reference value is measured by means of the photosensor, with the radiation deflected (scattered or reflected) by the dark reference sample being detected by the photosensor. A spectral measurement is carried out. The dark reference value is transmitted to the control unit. The deflected radiation is produced by radiation emitted by the light source being diffracted or reflected at the reference sample or, subsequently, at the sample to be measured.

In a further method step, a bright reference sample is pivoted into the beam path of the light source, with the result that the bright reference sample is located in the reference measurement plane. Subsequently, a bright reference value is measured by means of the photosensor, with the radiation deflected by the bright reference sample being detected by the photosensor. The bright reference value is transmitted to the control unit.

The dark reference sample has a particularly low reflectivity. Dark reference samples are known to those skilled in the art. The bright reference sample has a particularly high reflectivity. Bright reference samples are obtainable as certified reference samples and are known to those skilled in the art. In addition to the two reference samples, specifically the dark reference sample and the bright reference sample, use can be made of further types of reference samples, wherein the method steps should be carried out similarly to the steps with the reference sample.

A further method step provides for the control unit to carry out a correction calculation using the calibration values and reference values from the pre-calibration stored in the control unit, a dark current signal, and the measured dark reference value and the bright measurement value, with the detected actual temperature at the photosensor being taken into account. To carry out the correction calculation, a temperature-dependent measurement curve and/or a function for the correction calculation using the aforementioned values may be stored in the control unit.

In a further method step, the sample to be measured or examined is placed at or on the sample holder such that the sample is located at the measurement location. Subsequently, the photosensor carries out a spectral measurement of the radiation deflected by the sample, with a spectral value of the sample being determined. The sample may already be situated at the measurement location when the measurements with the dark reference sample and/or the bright reference sample are carried out since the said sample is placed in a different plane.

The sample is preferably a solid substance, in particular a bulk material. Alternatively, the sample may be formed by a liquid. Other substances are also conceivable as a sample. Particularly preferably, the sample to be measured is an agricultural produce, for example chopped maize, cereal, silage, hay, straw, meat, cheese, milk, wool, cotton. Consequently, it is possible to determine constituents and parameters of preferably organic substances or samples. For example, the constituents/parameters to be determined may be the following: moisture, protein, crude fiber, starch, sugar. The measurement is implemented by way of reflection or absorption spectroscopy by means of the spectroscopic measurement device.

A further method step provides for the measured spectral value of the sample to be corrected by the correction calculation, with the result that a corrected or final measurement value is obtained. The corrected measurement value is advantageously adjusted to remove temperature-related, systematic disturbances.

Since both the temperature and the actual and target values are considered in the correction calculation by way of the calibration samples and reference samples, the method according to the invention is advantageous in that disturbance variables which occur in the spectral measurement device as a result of temperature changes or, for example, aging processes of the light source can be removed by calculation or compensated for. Temperature-dependent disturbance variables are predominantly reflected in the dark signal, dark signal drift, and bright signal drift.

Preferably, the pre-calibration carried out at least during an initialization of the apparatus, preferably by the manufacturer, comprises at least one of the following method steps. The specific behavior of the photosensor at different temperatures is recorded precisely by way of the pre-calibration. For the first time, this makes it possible to resort to organic photodiodes even in applications with high requirements in respect of accuracy.

Within the scope of the pre-calibration, a bright calibration sample is arranged at the measurement location in a first method step. A bright calibration value is determined by virtue of radiation deflected by the bright calibration sample being detected by means of the photosensor.

Within the scope of the pre-calibration, a dark calibration sample is arranged at the measurement location in a further method step. A dark calibration value is determined by virtue of radiation deflected by the dark calibration sample being detected by means of the photosensor. The dark calibration sample is preferably similar to the dark reference sample. Particularly preferably, a dark calibration measurement can be implemented without a dark calibration sample at the measurement location or when the light source is switched off so that the occurrence of stray light is prevented. Alternatively, the dark calibration sample is a beam trap. There is a reminder here that the measurement location does not change its position in the beam path of the measurement beam, and so the calibration samples adopt the same position during the pre-calibration as the samples to be measured at a later stage.

A further method step of the pre-calibration provides for a bright reference sample to be arranged in the reference measurement plane. A bright reference value is determined by virtue of radiation deflected by the bright reference sample being detected by means of the photosensor. The bright reference sample used for the pre-calibration is preferably the same bright reference sample which is used at a later stage during the sample measurement.

A further method step of the pre-calibration provides for a dark reference sample to be arranged in the reference measurement plane. A dark reference value is determined by virtue of radiation deflected by the dark reference sample being detected by means of the photosensor. The dark reference sample used for the pre-calibration is preferably the same dark reference sample which is used within the scope of the sample measurement.

In a further method step of the pre-calibration, a dark current signal is recorded by means of the photosensor when the light source is switched off.

In relation to the apparatus design, the measurement at the measurement location can be referred to as the external measurement and the measurement in the reference measurement plane as the internal measurement.

The method steps of the pre-calibration using the bright calibration sample, the dark calibration sample, the bright reference sample, and the dark reference sample, and the determination of the dark current signal are carried out at the same temperature, with the temperature values being recorded by means of the temperature sensor in the direct vicinity of the organic photodiodes which form the photosensor and being stored in the control unit, for example as a value table or in the style of a function describing the values.

In a further method steps, the aforementioned method steps using the bright calibration sample, the dark calibration sample, the bright reference sample, and the dark reference sample, and the determination of the dark current signal are each carried out at further temperature values, with the result that respective calibration values and reference values are recorded at in each case associated, defined temperatures along a predetermined temperature curve. The temperature change can occur in defined steps and is generated by means of known methods and equipment for the spectral measurement device. A temperature ramp is preferably passed through, with the aforementioned method steps of the pre-calibration being carried out. The temperature change is preferably implemented in the region of the photosensor, in particular in the measurement module. The temperature change is preferably obtained by means of a temperature control unit, which comprises electrical heating elements and/or electrical cooling elements. The temperature control unit is preferably arranged at the measurement module.

Alternatively, calibration values and reference values, and the dark current signal can be recorded in temperature steps at defined temperatures and further calibration values and reference values, and the dark current signal can be calculated from the recorded values by means of interpolation. Calibration values and reference values recorded during the pre-calibration and the dark current signal are stored in the control unit and preferably combined with one another by calculation. Alternatively, a temperature-dependent, spectral correction function is preferably produced from the calibration values and reference values recorded in the pre-calibration, and from the dark current signal.

The method steps of the pre-calibration are preferably carried out simultaneously for all spectral channels, with the result that values or correction functions from the pre-calibration are stored in the control unit for each spectral channel.

Preferably, the method steps of the pre-calibration are recorded once for each temperature value. Alternatively, the method steps of the pre-calibration can be recorded multiple times for each temperature value.

The pre-calibration may also be referred to as a factory calibration or self-calibration as it is preferably carried out at the factory where the measurement devices produced.

For the method of the pre-calibration, the dark reference sample can be replaced by a beam trap. Alternatively, a dark signal producible by the dark reference sample or the dark reference value recorded by the photodiode can be produced by covering the photodiode, with no deflected radiation from the dark reference sample being incident on the organic photodiode. By way of example, an opaque cover is used. This embodiment is particularly suitable for the sample measurement method steps, but can also be used for the pre-calibration method steps. Under the assumption that all photodiodes have the same temperature-dependent dark current, the dark reference value recorded by the covered photodiode can be assumed for all photodiodes. Preferably, the measurement module of this embodiment comprises the same type of current amplifier for all photodiodes. If different current amplifiers are used, then this has to be taken into account in the correction calculation.

Alternatively, a plurality of photodiodes may be covered for the purpose of determining the dark reference value.

By recording dark reference values for different temperatures, it is possible to produce a dark reference value curve or a dark signal curve, which is preferably recorded or alternatively calculated for each spectral channel or each photodiode. A calculation is more advantageous because recording the individual values is time-consuming and connected to great technical outlay. The calibration samples may be similar to the reference samples in one embodiment.

In the sample measurement, the individual measurements for the spectral channels are preferably carried out simultaneously. Alternatively, the individual measurements for the spectral channels can be taken sequentially separated by time intervals, but these should be kept as short as possible. Alternatively, the individual measurements for the spectral channels are preferably carried out simultaneously and sequentially.

The constituent of the sample to be measured is determined quantitatively in a further method step within the scope of the sample measurement, with suitable calculation methods, for example multivariate analyses or machine learning, being used.

A further alternative method step provides for a warning to be output and the measurement method to be terminated if a given maximum is exceeded for a measured temperature change at the photosensor. If the measured temperature change in subsequent temperature measurements is below the maximum, then the measurement method is restarted.

The measurement device according to the invention is designed to carry out the above-described pre-calibration method according to the invention and/or the method for correcting measurement errors. The two methods can be carried out immediately successively or spaced apart from one another in time. The measurement device comprises a housing in which a control unit, a light source, a sample holder, and a spectral measurement module are arranged, with the measurement module having at least one photosensor with at least one organic photodiode, preferably a plurality of organic photodiodes, arranged on a substrate and with at least one temperature sensor. The housing serves to protect the component parts situated therein from mechanical, chemical, optical, electromagnetic, and thermal disturbances.

Furthermore, the measurement device preferably comprises a thermal body which is arranged in the measurement module directly at the photosensor in order to dissipate heat generated by the photosensor. The thermal body has a high heat capacity and a high thermal conductivity and is preferably made of aluminum or copper. The thermal body is preferably thermally connected to the substrate of the photosensor.

Advantageously, the substrate of the photosensor on which the photodiodes are arranged consists of a material with a high thermal conductivity in order to dissipate heat. The thermal conductivity of the substrate is preferably at least 5 W/(m*K). For example, the substrate consists of diamond, sapphire, silicon or germanium, which have a crystalline structure. Alternatively, use can be made of metals or semiconductors as the substrate material, with these comprising an electrical insulation layer. The substrate is preferably transparent or opaque for measurement radiation.

The temperature sensor is preferably arranged directly at the photosensor. Alternatively, the temperature sensor is arranged indirectly at the photosensor, with it being arranged at the thermal body, for example. If the photosensor comprises a large number of organic photodiodes such that there could be a temperature difference therebetween, then the measurement module preferably comprises a plurality of temperature sensors which are arranged at a distance from one another and are each arranged close to the assigned organic photodiodes.

In an embodiment where each photodiode is arranged separately on an individual substrate, a temperature sensor is preferably arranged at each substrate.

Preferably, a shielding is arranged around the unit (measurement module) made of photosensor with the at least one organic photodiode, the temperature sensor and the thermal body, with the shielding being intended to shield against ambient influences, for example electric or magnetic fields. Further, the shielding serves as a barrier against optical interference radiation. By way of example, the shielding is made of aluminum and has good thermal conductivity in order to ensure a largely homogenous temperature within the shielding or measurement module.

Preferably, a spectral filter for filtering spectral components is arranged in the beam path of the scattered radiation at an entrance surface for the scattered radiation into the measurement module or in the shielding of the measurement module. By way of example, the spectral filter is a long-pass filter or a bandpass filter.

According to a preferred embodiment, a temperature control unit is arranged at the measurement module on the surface opposite to the entrance surface of the scattered radiation into the measurement module.

The measurement device preferably comprises a plurality of optical units. A first optical unit is an illumination optical unit which is arranged in the beam path at a distance from the light source and which ensures homogenous illumination. A second optical unit is an imaging optical unit which is arranged in the beam path of the scattered radiation at a distance from the measurement module and which serves to homogenize the scattered radiation. Furthermore, the imaging optical unit serves to eliminate specularly reflected radiation possibly arising at the sample holder due to the light source, since this radiation is considered to be interference radiation.

In an embodiment, the measurement device comprises a beam trap which serves to suppress interference radiation. On its side facing the radiation, the beam trap has a surface with high absorption. The beam trap preferably has the form of a funnel. Other shapes, for example a flat or arching shape, are conceivable.

The light source is preferably chosen so that it covers the sensitivity range of the organic photodiode. The light source preferably emits a radiation in the infrared (IR) range or in the near-infrared (NIR) range. Alternatively preferably, the light source may emit a radiation in the visible (VIS) range. Alternatively, a chosen radiation of the light source in the ultraviolet (UV) range is conceivable. The light source is preferably semiconductor-based with a plurality of spectral emission lines and preferably consists of a broadband-emitting phosphor. For example, the light source may be chosen from the following sources: a halogen lamp, an arc lamp, other thermal sources, an LED, an SLD, a multiline laser, or a supercontinuum source. The light source particularly preferably emits in the wavelength range from 780 nm to 20 µm.

In modified embodiments, the measurement module may comprise a plurality of photosensors.

A plurality of photodiodes are coupled to a current amplifier for a particularly good transfer behavior. Each photodiode is particularly preferably assigned a current amplifier. The current amplifier is preferably a transimpedance converter. Alternatively, a current integrator can be used as a current amplifier.

In a modified embodiment, fewer current amplifiers than photodiodes are arranged in the measurement module, with the result that an electrical multiplexer is preferably arranged in the measurement module and serves the purpose of sequentially connecting the current amplifiers to the organic photodiodes.

The reference samples are preferably pivotable into the beam path level with the reference measurement plane. The reference samples are preferably integrated into the measurement device as a constituent part, with these being able to be pivoted into the beam path manually, for example by means of a lever, or mechanically. Alternatively, the reference samples are available to the user and can be brought by the latter into the reference measurement plane.

The sample holder preferably has a transparent embodiment. The sample holder is preferably rotatable, with it preferably rotating during the measurement of the sample so that an averaged value is determined for the entire sample positioned on the sample holder. The rotation of the sample holder can be realized by way of a motor.

The sample holder is preferably positioned so that the sample is pressed against the sample holder by gravity. Alternatively, the sample can be pressed against the sample holder mechanically or by way of centrifugal forces.

An advantage of the described measurement device is that the measurement device can be produced cost-effectively on account of the use of organic photodiodes. This applies especially to large numbers of items. A further advantage is that the measurement device according to the invention is designed to carry out the method according to the invention, with the result that measurement errors which occur on account of temperature drift and/or component wear of the measurement apparatus can be eliminated in order to obtain better measurement results in relation to the sample. Exact measurement results are important especially in the field of constituent analysis, in the case of which the measurement accuracy should be of the order of approximately 0.10.

A correction of a temperature drift for the measurement device is advantageous since the temperature sensitivity or temperature dependence of organic photodiodes is significantly greater than the temperature sensitivity of inorganic photodiodes. The measurement device is advantageously designed for use at operating temperatures from approximately 0° C. to 70° C.

In an embodiment, the measurement device is designed as a tabletop apparatus. In a further embodiment, the measurement device is a hand-held apparatus which can be held by the user. Robot-guided equipment or a remote-controlled drone are also conceivable as embodiments of the measurement apparatus.

The measurement device is preferably supplied with power by means of a rechargeable battery. Alternatively, the measurement device can be supplied by a power socket. Likewise, electrical or optical interfaces for power supply and for data interchange with the measurement device are advantageous. To allow a data interchange, the measurement device may comprise a component for establishing a radio connection. The measurement device preferably comprises analog and digital electronics. In an embodiment, the measurement device comprises an indication apparatus, for example a display, which may also have operating elements.

The measurement device preferably comprises a temperature control unit which serves to change the temperature of all component parts in the measurement module or all component parts within the shielding, and which varies the temperature depending on the setting. Heating resistors can be used as electrical heating elements. Additional cooling elements can be formed by thermoelectric cooling means. The temperature control unit is used for the pre-calibration in particular. The temperature control unit can be used during the sample measurement method steps, but this is generally not desired as this is accompanied by great work complexity and very time-consuming. The temperature control unit can be an external system in a modified embodiment.

The control unit preferably comprises an analog-to-digital converter (ADC). The control unit particularly preferably comprises a plurality of ADCs, which are each assigned to a current amplifier so that a high measurement speed is obtained. Fewer ADCs are required in the measurement module if an electrical multiplexer is used in the measurement module, and so the production costs are reduced. In an embodiment the measurement module only comprises one ADC which, by means of a multiplexer, converts signals of a plurality of current amplifiers connected to the multiplexer.

BRIEF DESCRIPTION OF THE DRAWINGS

Further advantages, details and modifications of the invention will become apparent from the following description of preferred embodiments, with reference being made to the drawing. In the drawing.

DETAILED DESCRIPTION OF THE INVENTION

Figure 1:
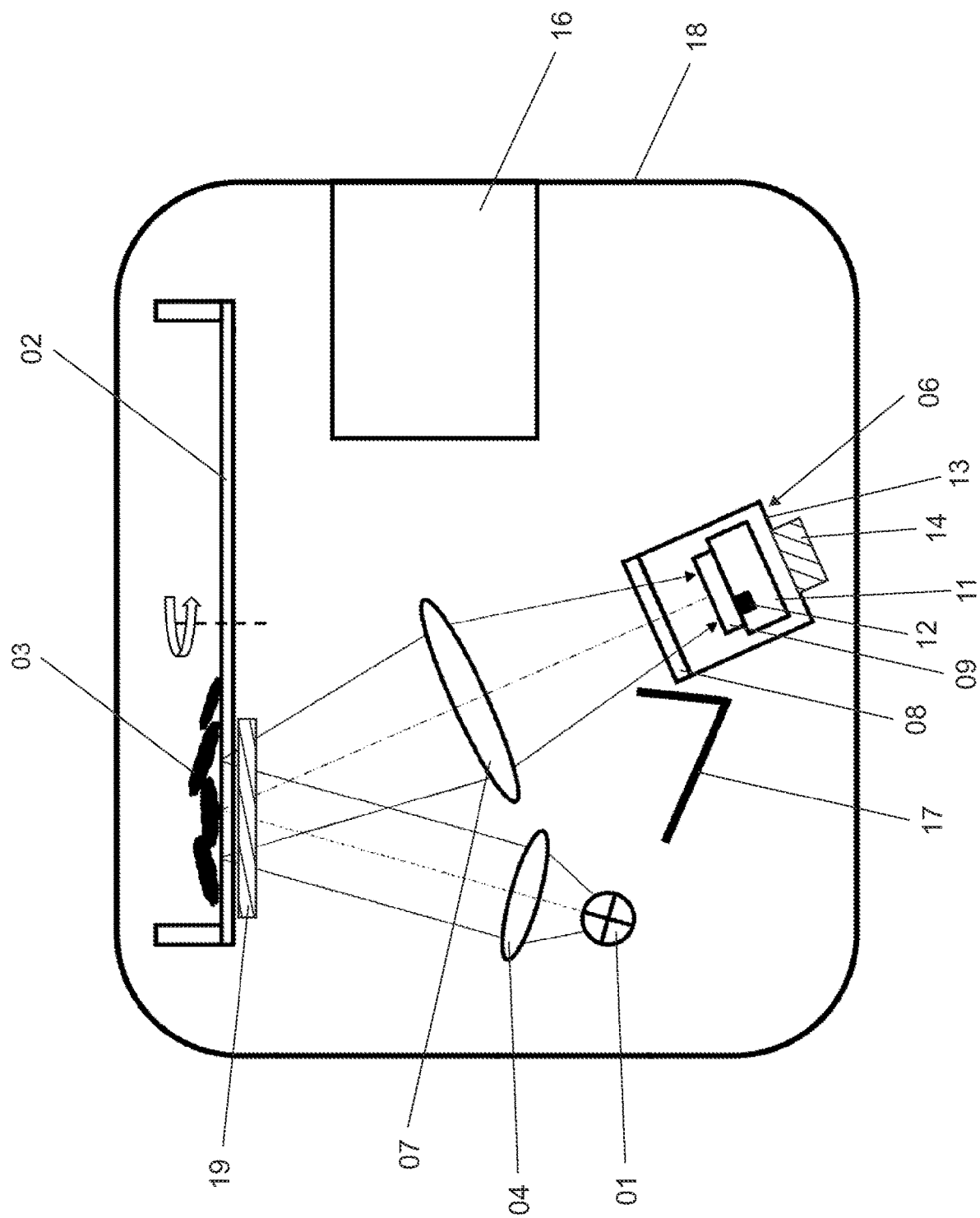
FIG. 1 shows a simplified representation of the basic structure of a measurement device according to the invention.

FIG. 1 shows a simplified representation of the basic structure of a spectroscopic measurement device according to the invention, which is configured to carry out a pre-calibration method according to the invention or a method for correcting measurement errors which may occur due to temperature drift and/or component wear in the measurement device.

The measurement device comprises a light source 01, in the emitted beam path of which a sample holder 02 is arranged. The light source 01 preferably has a spectrum in the infrared range. The sample holder 02 is designed to be transparent, rotatable about an axis, and in the shape of a cylinder or pot, with one cylinder side being formed open and the opposite cylinder side being formed closed. A sample 03 to be measured, for example an agricultural produce, is situated on the sample holder 02, with gravity keeping the sample 03 on the sample holder 02. Together with the sample holder 02, the sample 03 is in the beam path of the light source 01. The radiation emitted by the light source 01 is homogenized by means of an illumination optical unit 04, with the illumination optical unit 04 being arranged between the light source 01 and the sample holder 02.

The emitted radiation is scattered at the sample 03 and the radiation scattered by the sample 03 is incident on a measurement module 06, which is likewise a constituent part of the measurement device. An imaging optical unit 07 for homogenizing the scattered radiation is arranged between the sample holder 02 with the sample 03 and the measurement module 06.

The measurement module 06 comprises a spectral filter 08 which is arranged at the beam input-side on the measurement module 06. Furthermore, the measurement module 06 comprises a photosensor 09, which consists of a substrate with a plurality of organic photodiodes arranged thereon (cf. FIG. 2). The substrate may be in one piece and carry all organic photodiodes, or it may be designed in many pieces for one or more photodiodes in each case. The photosensor 09 serves to detect or measure the radiation scattered by the sample 03. To dissipate heat arising at the photosensor 09, the measurement module 06 furthermore comprises a thermal body 11, which is coupled to the photosensor 09. A temperature sensor 12 is preferably arranged directly at the photosensor 09, but it may alternatively also be arranged at the thermal body 11. The temperature sensor 12 detects the temperature of the organic photodiode(s) (cf FIG. 2). The measurement module 06 is surrounded by a shielding 13, which shields against ambient influences and keeps the temperature in the measurement module 06 stable. The spectral filter 08, photosensor 09, temperature sensor 12, and thermal body 11 component parts are arranged within the shielding 13. A temperature control unit 14 is arranged outside of the shielding 13 and at the latter.

Furthermore, the measurement device comprises a control unit 16, to which the sample measurement value recorded by the photosensor 09 is transmitted. A beam trap 17 serving to suppress interference radiation is arranged at a distance from the measurement module 06. A housing 18 is a further component part of the measurement device and it surrounds all the aforementioned component parts of the measurement device and protects these from external ambient influences.

Furthermore, the measurement device comprises a pivotable reference sample 19 arranged between the sample holder 02 with the sample 03 and the light source 01 such that, in the pivoted-in state, the reference sample 19 is located in the beam path of the light source 01. Preferably, the reference sample 19 is located in a reference measurement plane at a small distance from the sample holder 02. The reference sample 19 is a dark reference sample and/or a bright reference sample, which are available to the user as certified samples.

For the method according to the invention, which is implementable by means of the measurement device according to the invention, the respective reference samples 19, which are also referred to as internal samples, are pivoted in and out as a dark reference sample in one method step and are pivoted in and out as a bright reference sample in a further method step, with in each case a reference value of the radiation scattered at the respective reference sample 19 being recorded by the photosensor 09 and stored and/or processed further in the control unit 16.

Moreover, calibration values and reference values recorded in a pre-calibration are stored in the control unit 16, with the calibration values having been produced by means of calibration samples (not shown) in an earlier method stage at a measurement location where the sample 03 is also positioned. The calibration samples may also be referred to as external samples. Furthermore, a value representative of a dark current signal determined during the pre-calibration is stored in the control unit 16.

The control unit 16 performs a correction calculation for the recorded spectral value of the sample 03 by means of the recorded calibration values and reference values, and the dark current signal from the pre-calibration, and the bright reference value and the dark reference value of the reference samples 19, which were recorded in further method steps, and the temperature values recorded by the temperature sensor 12. Consequently, the recorded spectral value of the sample 03 is adjusted to remove disturbances occurring as a result of temperature influence and/or aging processes on the component parts of the measurement device, and an exact or final value is determined. It is the object of the method according to the invention to render a highly precise temperature control at the photosensor superfluous during the measurements in the operational state by virtue of current measurement values being corrected on the basis of performed calibration and reference measurements and a continuous detection of the temperature.

The final value determined following the correction of the recorded spectral value is a disturbance-free, final spectral value or a final spectrum. This final value is determined for each organic photodiode (cf. FIG. 2), which respectively forms one spectral channel. Six measurement variables are preferably combined by calculation for the calculation of the respective value of the final spectrum. The measurement variables are determined on the basis of the above-described method steps. Furthermore, the reflectivity of the bright reference sample (internal bright sample) and bright calibration sample (external bright sample) are assumed to be known. In particular, the reflectivity of the bright reference sample and bright calibration sample is regularly approximately 99%.

Such a correction calculation is described in more detail hereinafter in exemplary fashion:

The function for the correction calculation builds on known raw signals and raw signals to be determined. The dark current signal DS(T) is determined as one raw signal in one method step by a single measurement, preferably during the pre-calibration. Four further raw signals are determined during the pre-calibration method steps at in each case a detected temperature T, specifically the dark reference value iDR(T,LQ), the bright reference value iHR(T,LQ), the dark calibration value eDR(T,LQ), and the bright calibration value eHR(T,LQ). In one step, a spectral value of the sample to be measured ePM(T,LQ) is recorded during the sample measurement at a detected temperature T; this spectral value is an external spectral value (LQ represents the dependence on the intensity of the light source for the assigned wavelength range).

The reflectivities $R_{iDR}$ of the dark reference value iDR(T, LQ) and $R_{eDR}$ of the dark calibration value eDR(T,LQ) are determined by way of the photosensor from the reflection and the stray light of the light source at the dark reference sample and dark calibration sample, respectively. The reflectivities $R_{iHR}$ of the bright reference value iHR(T,LQ) and $R_{eHR}$ of the bright calibration value eHR(T,LQ) can be considered to be known, wherein these are approximately 99%. The variable sought is the actual reflectivity $R_{ePM}$ of the sample to be measured, which is arranged at the measurement location.

Furthermore, a bright signal HS(T,LQ) is determined, where f(T,LQ) or f(EQE,LQ) applies (EQE is the quantum efficiency).

The equations for determining the dark reference value iDR(T,LQ), the bright reference value iHR(T,LQ), the dark calibration value eDR(T,LQ), and the bright calibration value eHR(T,LQ), and the spectral value of the sample to be measured ePM(T,LQ) are listed below, where i represents internal and e represents external.

$$iDR(T,LQ)=DS(T)+iHS(T,LQ)*R_{iDR}$$

$$iHR(T,LQ)=DS(T)+iHS(T,LQ)*R_{iHR}$$

$$eDR(T,LQ)=DS(T)+eHS(T,LQ)*R_{eDR}$$

$$eHR(T,LQ)=DS(T)+eHS(T,LQ)*(R_{eHR}+R_{eDR})$$

$$ePM(T,LQ)=DS(T)+eHS(T,LQ)*(R_{ePM}+R_{eDR})$$

Consequently, five equations are available for the correction calculation, and these contain five unknowns, specifically the internal bright signal iHS(T,LQ), the external bright signal eHS(T,LQ), the reflectivity $R_{iDR}$ of the dark reference value, the reflectivity $R_{eDR}$ of the dark calibration value, and the reflectivity of the sample to be measured $R_{ePM}$. The reflectivity of the sample to be measured $R_{ePM}$ is the sought value.

A person skilled in the art knows how to determine a value for which five equations with five unknowns apply. By rearranging and inserting the equations, the following formulations apply to the unknown variables:

The following applies to the internal bright signal iHS(T, LQ):

$$iHS(T,LQ)=[iHR(T,LQ)-DS(T)]/R_{iHR}$$

The following applies to the reflectivity $R_{iDR}$ of the dark reference value:

$$R_{iDR}=[iDR(T,LQ)-DS(T)]/iHS(T,LQ)$$

The following applies to the external bright signal eHS (T,LQ):

$$eHS(T,LQ)=[eHR(T,LQ)-eDR(T,LQ)]/R_{eHR}$$

$$=[b*iHR(T,LQ)-a*iDR(T,LQ)]/R_{eHR}$$

The following applies to the reflectivity $R_{eDR}$ of the dark calibration value:

$$R_{eDR}=[eDR(T,LQ)-DS(T)]/eHS(T,LQ)=[a*iDR(T,LQ)-DS(T)]/eHS(T,LQ)$$

The following applies to the reflectivity of the sample to be measured $R_{ePM}$:

$$R_{ePM}=[ePM(T,LQ)-DS(T)]/eHS(T,LQ)-R_{eDR}$$

The following applies to the variable a as a function of the temperature:

$$a(T)=eDR(T_{ramp},LQ_{initial})/iDR(T_{ramp},LQ_{initial})$$

The following applies to the variable b as a function of the temperature:

$$b(T)=eHR(T_{ramp},LQ_{initial})/iHR(T_{ramp},LQ_{initial})$$

The variables a(T) and b(T) are independent of LQ, which is to say they take account of the current LQ fluctuations.

The assumption is made that the temperature dependence of a(T) and b(T) is the same for eDR and iDR, and also eHR and iHR, and these can consequently be measured on the basis of a single measurement along a temperature ramp (incremental change of temperature with an incremental measurement of the respective variables) as $a(T_{ramp})$ and $b(T_{ramp})$. The determined values $a(T_{ramp})$ and $b(T_{ramp})$ are preferably stored in the control unit, in particular as a lookup table.

The corrected reflectivity of the sample to be measured $R_{ePM}$ represents the sought final spectrum.

Figure 2:
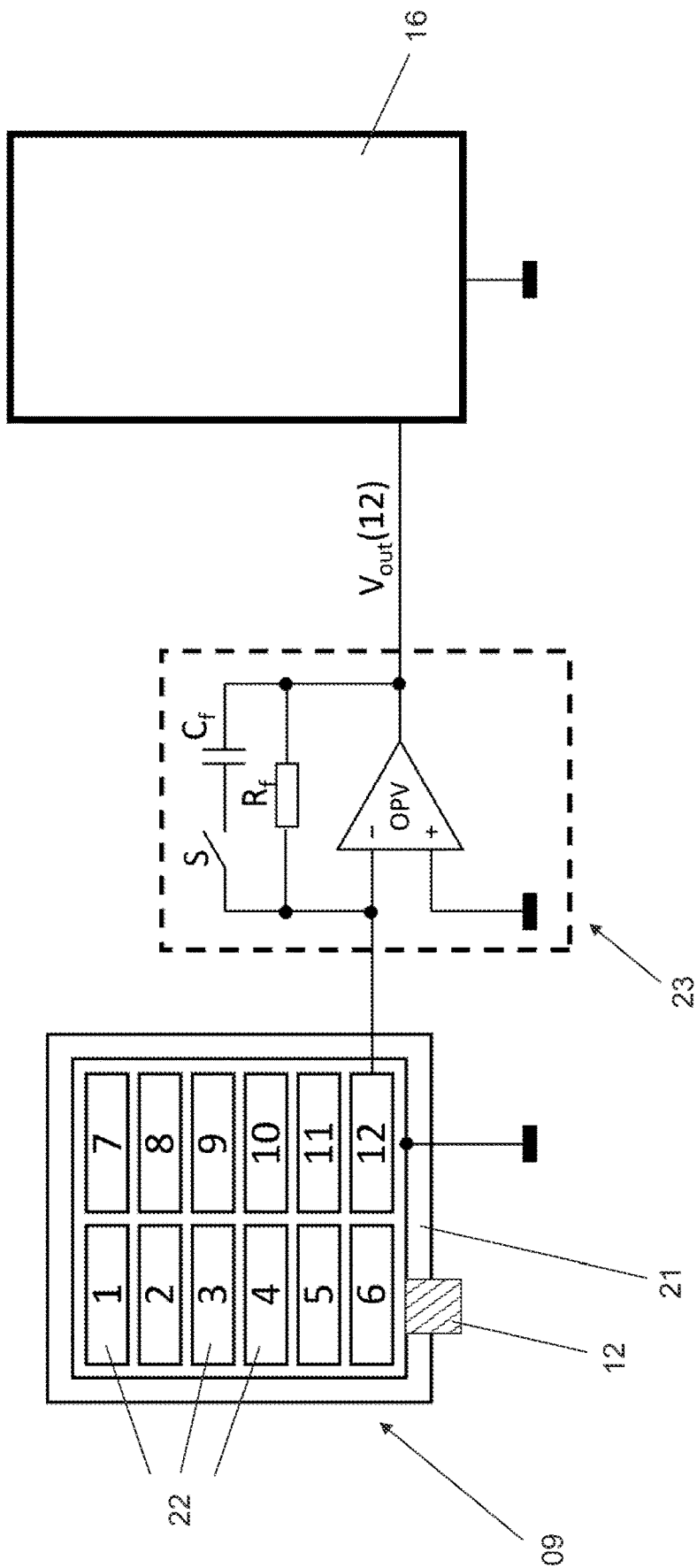
FIG. 2 shows a simplified representation of a first embodiment of a measurement module of the measurement device.

FIG. 2 shows a simplified representation of a first embodiment of the measurement module 06 of the measurement device. The photosensor 09 with the organic photodiodes 22 arranged on the substrate 21 is represented symbolically. A total of twelve organic photodiodes 22 are arranged in two rows on the substrate 21 which has a high thermal conductivity. Every organic photodiode 22 represents a sensor pixel. The photosensor 09 is arranged on the thermal body 11. The temperature sensor 12 is attached to the photosensor 09. The organic photodiodes 22 are coupled to a current amplifier 23, which in turn is connected to the control unit 16.

Figure 3:
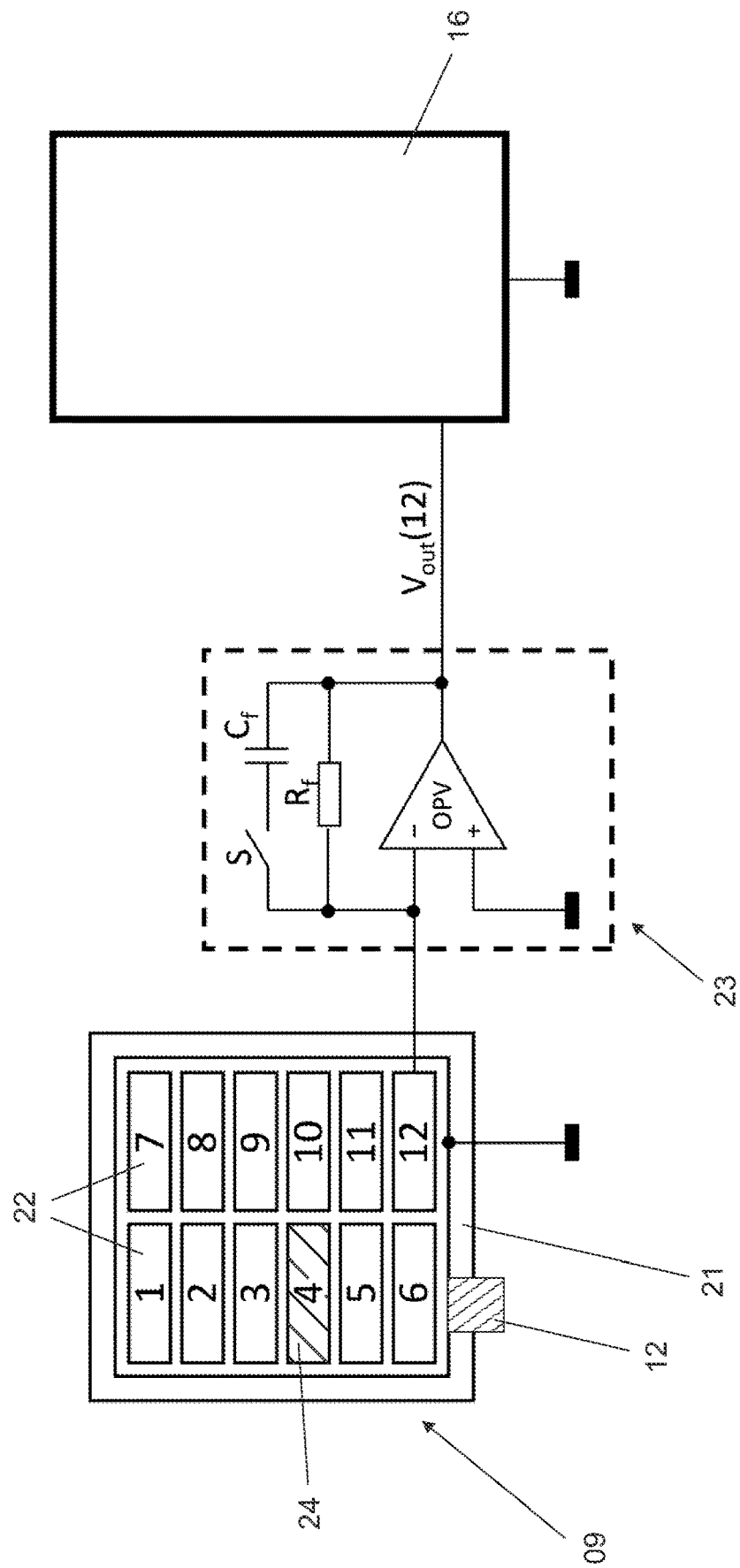
FIG. 3 shows a simplified representation of a second embodiment of the measurement module of the measurement device.

FIG. 3 shows a simplified representation of a second embodiment of the measurement module of the measurement device, with FIG. 3 initially resembling the embodiment shown in FIG. 2. Deviating from FIG. 2, FIG. 3 shows a covered organic photodiode 24 which serves as a dark reference, with the result that a dark reference signal can be recorded for the photodiode. Under the assumption that all organic photodiodes 22 have the same temperature-dependent dark current, this dark reference signal can be assumed for all photodiodes 22. The cover is chosen so that no radiation arrives at the covered organic photodiode 24.

What is claimed is:

1. A method for pre-calibrating a spectroscopic measurement device comprising a control unit, a light source, a sample holder arranged in the beam path of the light source and defining a measurement location, and a spectral measurement module which has a photosensor with a plurality of organic photodiodes arranged on a substrate and with a temperature sensor, with calibration values being determined at the measurement location and reference values being determined in a reference measurement plane, the said method comprising the following steps:
   i.) arranging a bright calibration sample at the measurement location and determining a bright calibration value by measuring a deflected radiation by means of the photosensor;
   ii. arranging a dark calibration sample at the measurement location and determining a dark calibration value by measuring a deflected radiation by means of the photosensor;
   iii.) arranging a bright reference sample in the reference measurement plane and determining a bright reference value by measuring a deflected radiation by means of the photosensor;
   iv.) arranging a dark reference sample in the reference measurement plane and determining a dark reference value by measuring a deflected radiation by means of the photosensor;
   v.) recording a dark current signal when the light source is switched off; and
   vi.) repeating steps i. to v. at different temperatures along a predetermined temperature curve, with the temperature and a bright reference value, a bright calibration value, a darkness reference value, a darkness calibration value, and a dark current signal being recorded for each temperature value; and
   vii.) storing the determined calibration and reference values in the control unit.

2. A method for correcting measurement errors which occur in a spectroscopic measurement device on account of temperature drift and/or component wear, the measurement device comprising a control unit, a light source, a sample holder arranged in the beam path of the light source and defining a measurement location, and a spectral measurement module, the measuring module having a photosensor with a plurality of organic photodiodes arranged on a substrate and a temperature sensor arranged at the photosensor, wherein the following steps are carried out during a sample measurement:
   detecting the actual temperature at the photosensor by means of the temperature sensor;
   pivoting a dark reference sample into the beam path of the light source such that the dark reference sample is located in a reference measurement plane, and measuring a dark reference value by means of the photosensor;
   pivoting a bright reference sample into the beam path of the light source such that the bright reference sample is located in the reference measurement plane, and measuring a bright reference value by means of the photosensor;
   arranging a sample to be examined on the sample holder such that the said sample is located at a measurement location offset from the reference measurement plane, and measuring a spectral value of the sample by means of the photosensor; and
   correcting the recorded spectral value of the sample by means of a correction calculation by way of the control unit using calibration and reference values obtained during a pre-calibration, the measured dark reference value, the bright reference value and the detected actual temperature.

3. The method as claimed in claim 2, wherein the pre-calibration, in which the calibration values and the reference values are determined, comprises the following steps:
   i.) arranging a bright calibration sample at the measurement location and determining a bright calibration value by measuring a deflected radiation by means of the photosensor;
   ii.) arranging a dark calibration sample at the measurement location and determining a dark calibration value by measuring a deflected radiation by means of the photosensor;
   iii.) arranging a bright reference sample in the reference measurement plane and determining a bright reference value by measuring a deflected radiation by means of the photosensor;
   iv.) arranging a dark reference sample in the reference measurement plane and determining a dark reference value by measuring a deflected radiation by means of the photosensor;
   v.) recording a dark current signal when the light source is switched off; and
   vi.) repeating steps i. to v. at different temperatures along a predetermined temperature curve, with the temperature and a bright reference value, a bright calibration value, a darkness reference value, a darkness calibration value, and a dark current signal being recorded for each temperature value; and
   vii.) storing the determined calibration and reference values and the control unit.

4. The method as claimed in claim 3, wherein a function representing the calibration values and reference values and serving to carry out the correction calculation is determined and stored in the control unit.

5. A measurement device for spectroscopic constituent analysis, comprising a housing, in which a control unit, a light source, a sample holder in the beam path of the light source, and a spectral measurement module are arranged, the measurement module having at least one photosensor with a plurality of organic photodiodes arranged on a substrate and a temperature sensor arranged at the photosensor, and the measurement device being designed to carry out the method for correcting measurement errors as claimed in claim 2.

6. The measurement device as claimed in claim 5, wherein the light source emits a radiation in a range selected from the group consisting of the infrared range, the visible range and the ultraviolet range.

7. The measurement device as claimed in claim 5, wherein the said measurement device furthermore comprises at least one optical unit arranged in the beam path.

8. The measurement device as claimed in claim 5, wherein the measurement module furthermore comprises a thermal body arranged at the photosensor.

9. The measurement device as claimed in claim 5, wherein a spectral filter located in the beam path is arranged at the measurement module.

10. The measurement device as claimed in claim 5, wherein the photosensor comprises 2 to 2000 organic photodiodes.

11. The measurement device as claimed in claim 5, wherein the photosensor comprises 3 to 200 photodiodes.

12. The measurement device as claimed in claim 5, wherein the photosensor comprises 4 to 100 photodiodes.

* * * * *